July 28, 1942.　　V. E. MATULAITIS　　2,291,189
POWER TRANSMISSION
Filed Aug. 8, 1941　　4 Sheets-Sheet 1

INVENTOR
Victor E. Matulaitis.
BY
Harness, Lund, Patee & Harris
ATTORNEYS.

July 28, 1942.　　V. E. MATULAITIS　　2,291,189
POWER TRANSMISSION
Filed Aug. 8, 1941　　4 Sheets-Sheet 3

INVENTOR
Victor E. Matulaitis
BY
ATTORNEYS.

Patented July 28, 1942

2,291,189

UNITED STATES PATENT OFFICE 2,291,189

POWER TRANSMISSION

Victor E. Matulaitis, Detroit, Mich., assignor to Chrysler Corporation, Highland Park, Mich., a corporation of Delaware Application August 8, 1941, Serial No. 405,946

8 Claims. (Cl. 74—472)

This invention relates to motor vehicles and refers more particularly to power transmission and control mechanism therefor.

My invention has particular reference to transmission systems in which the torque load is relieved, as by momentary interruption of the engine ignition or by other suitable means, in order to unload positively engageable drive control elements so as to facilitate disengagement of such elements. One example of such a transmission is described and claimed in the copending application of Carl A. Neracher et al., Serial No. 335,310, filed May 15, 1940.

Heretofore, as in said Neracher et al. application, it is customary to provide a shiftable drive control element adapted to be unloaded, as aforesaid, to facilitate disengagement thereof with a companion drive control element so arranged in a transmission that when the drive control elements are relatively engaged there is provided a speed ratio drive and when relatively disengaged there is provided another speed ratio drive usually slower than the first said drive. Prime mover means, such as a vacuum operated piston and piston rod for example, is customarily provided for controlling shift of the shiftable drive control element such that the vacuum power will cause the piston to unload a disengaging spring preparatory for engaging the drive control elements. Electromagnetically controlled valving is usually provided for controlling venting and vacuum operation of the piston such that when the piston is vented then the disengaging spring operates to effect disengaging shift of the shiftable drive control element accompanied by ignition interruption. Customarily, there is provided an ignition interrupter switch operated by movement of the piston rod, it being desirable to cause interruption only during the disengaging stroke of the piston rod and not on the return stroke which accommodates engagement of the drive control elements. Usually, as in said Neracher et al. application, this is brought about by reason of an electrical system in which a kickdown switch and a governor switch are arranged for parallel grounding for a circuit controlling the electromagnetically operated valving and the ignition interruption such that when the piston rod moves on its said return stroke then ignition interruption does not take place because, even though the ignition interrupter switch closes, the ignition is not grounded out because at such time neither the kickdown switch nor the governor switch is closed and hence the firing of the engine is not interrupted during acceleration from vehicle standstill in the slower ratio drive.

It is desirable for various reasons to arrange the governor and kickdown switches in series with a ground and the electromagnetically operated valving and with such arrangement, if the customary ignition interrupter switch and piston rod assembly was employed, then ignition interruption would occur during said return stroke of the piston rod because both the kickdown switch and the governor switch would then be closed. In the series switch arrangement it is desirable to arrange the kickdown switch closed and the governor switch open when the car is at a standstill whereas in the parallel switch arrangement it is desirable to have the kickdown switch open and the governor switch closed with the car at standstill.

It is an object of my invention to provide improved ignition interruption control means adapted for use with a transmission control of the general type aforesaid and which is capable of being employed in a series arrangement of kickdown and governor switches without resulting in engine missing or ignition interruption on the return stroke of the piston or other prime mover operator, such interruption occurring only at the desired time to facilitate relative disengagement of the drive control elements.

Another object is to provide improved and simplified means for controlling the torque-relieving or torque reversing means.

Another object is to provide a transmission control which is more fool-proof in its operation and in the general drive functions of the vehicle.

A further object is to provide an improved prime mover and ignition interrupter switch assembly for controlling shift of a shiftable drive control element.

A still further object is to provide improved control means for the torque-relieving means whereby the torque relief is brought about only as an incident to the one desired direction of movement of the actuating means for the movable or shiftable drive control element and not during the return direction of movement of this actuating means.

Further objects and advantages of my invention reside in the novel combination and arrangement of parts more particularly hereinafter described and claimed, reference being had to the accompanying drawings in which:

While my control may be employed in conjunction with various types and arrangements of motor vehicle transmissions, especially where a pair of relatively movable positively engageable drive control elements is employed, in order to illustrate one driving system I have shown my invention in connection with certain parts of the aforesaid Neracher et al. application.

In the drawings A represents the internal combustion engine which drives through fluid coupling B and conventional type of friction main clutch C to the speed ratio transmission D whence the drive passes from output shaft 20 to drive the rear vehicle wheels in the usual manner.

Figure 1:
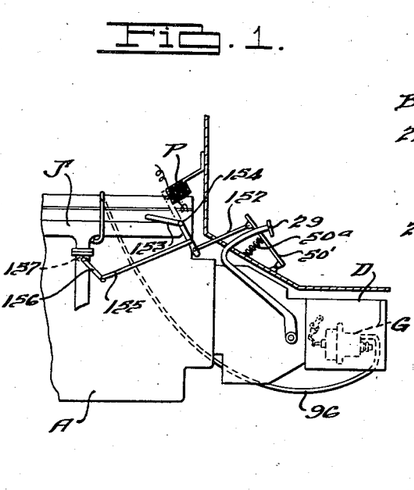
Fig. 1 is a side elevational view showing the motor vehicle engine and power transmission.
Figure 2:
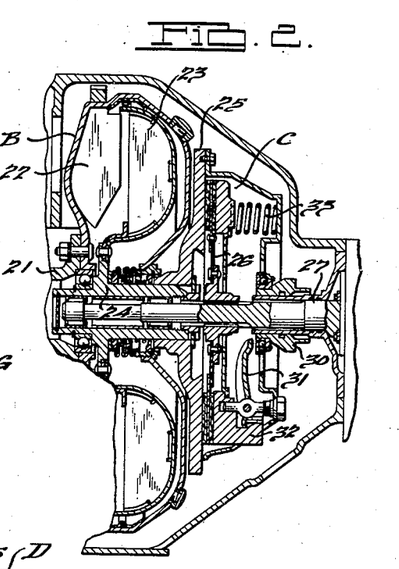
Fig. 2 is a longitudinal sectional elevational view through the main clutching mechanism.

The engine crankshaft 21 carries the vaned fluid coupling impeller 22 which in the well known manner drives the vaned runner 23 whence the drive passes through hub 24 to clutch driving member 25. This member then transmits the drive, when clutch C is engaged as in Fig. 2, through driven member 26 to the transmission driving shaft 27 carrying the main drive pinion 28. A clutch pedal 29 controls clutch C such that when the driver depresses this pedal, collar 30 is thrust forward to cause levers 31 to release the clutch driving pressure plate 32 against springs 33 thereby releasing the drive between runner 23 and shaft 27. The primary function of the main clutch C is to enable the driver to make shifts between neutral, forward and reverse in transmission D.

Figure 3:
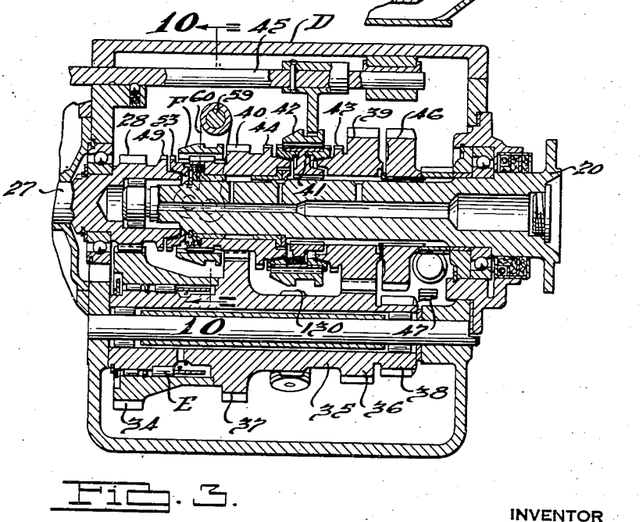
Fig. 3 is a similar view through the change speed transmission.

Referring to the transmission, pinion 28 is in constant mesh with gear 34 which drives countershaft 35 through an overrunning clutch E of the usual well known type such that when shaft 27 drives in its usual clockwise direction (looking from front to rear) then clutch E will engage to lock gear 34 to countershaft 35 whenever the gear 34 tends to drive faster than the countershaft. However, whenever this gear 34 tends to rotate slower than the countershaft then clutch E will automatically release whereby shaft 27, under certain conditions, may readily drop its speed while countershaft 35 continues to revolve.

Countershaft 35 comprises cluster gears 36, 37 and 38 which respectively provide drives in first, third and reverse. Freely rotatable on shaft 20 are the first and third driven gears 39 and 40 respectively in constant mesh with countershaft gears 36 and 37. A hub 41 is splined on shaft 20 and carries therewith a manually shiftable sleeve 42 adapted to shift from the Fig. 3 neutral position either rearwardly to clutch with teeth 43 of gear 39 or else forwardly to clutch with teeth 44 of gear 40. Sleeve 42 is operably connected to shift rail 45 adapted for operation by any suitable means under shifting control of the vehicle driver.

Shaft 20 also carries reverse driven gear 46 fixed thereto. A reverse idler gear 47 is suitably mounted so that when reverse drive is desired, idler 47 is shifted into mesh with gears 38 and 46.

First, third and reverse speed ratio drives and neutral are under manual shift control of the vehicle driver, the main clutch C being released by depressing pedal 29 in shifting into any one of these drives.

First is obtained by shifting sleeve 42 to clutch with teeth 43, the drive passing from engine A, through fluid coupling B, clutch C and shaft 27 to pinion 28, thence through gear 34 and clutch E to countershaft 35. From the countershaft the drive is through gears 36, 39 and sleeve 42 to shaft 20.

Third is obtained by shifting sleeve 42 to clutch with teeth 44, the drive passing from the engine to the countershaft 35 as before, thence through gears 37, 40 and sleeve 42 to shaft 20.

Reverse is obtained by shifting idler into mesh with gears 38, 46, sleeve 42 being in neutral, the reverse drive passing from the engine to the countershaft 35 as before, thence through gears 38, 47 and 46 to shaft 20.

Slidably splined on teeth 48 carried by gear 40 is the automatic clutching sleeve F which, under certain conditions, is adapted to shift forwardly to clutch with teeth 49 carried by pinion 28 thereby positively clutch shaft 27 directly to gear 40. The sleeve F is adapted to step-up the speed ratio drive from first to second and from third to fourth which is a direct drive speed ratio. Control means is provided which limits clutching of sleeve F to approximate synchronism with teeth 49 and also to a condition of engine coast, sleeve F being prevented from clutching during that condition known as engine drive as when the engine is being speeded up under power.

When driving in first, second is obtained by the driver releasing the usual accelerator pedal 50′ thereby allowing spring 50ᵃ to close the engine throttle valve and cause the engine to rapidly coast down. When this occurs, the engine along with shaft 27, pinion 28 and gear 34 all slow down while shaft 20 along with gears 39 and 36 continue their speeds by accommodation of clutch E which now overruns. The engine slows down until teeth 49 are brought to approximate synchronism with sleeve F which thereupon automatically shifts to clutch with teeth 49 resulting in a two-way drive for second as follows: pinion 28 through sleeve F to gear 40 thence through gears 37, 36 and 39 to sleeve 42 and shaft 20, the clutch E overrunning.

When driving in third, fourth or direct is obtained just as for second by driver release of the accelerator pedal and resulting shift of sleeve F to clutch with teeth 49 when these parts are synchronized by reason of the engine coasting down from the drive in third. The direct drive is a two-way drive as follows: pinion 28 through sleeve F to gear 40 thence directly through sleeve 42 to shaft 20, clutch E overrunning as before.

Referring to Figs. 4 to 9 there is shown the blocking means for controlling clutching shift of sleeve F so as to limit clutching thereof to engine coasting and synchronous relationship of the clutching parts. Sleeve F is provided with a series of pairs of what may be termed long and short teeth 50, 51 certain of which may be bridged or joined together. A blocker ring 52 is provided with blocking teeth 53 which either lie in the path of forward shift of teeth 50 or 51 or else between these teeth to allow clutching shift of sleeve F. Thus, blocker 52 has, at suitable locations, a drive lug 54 engaged in a slot 55 of gear 40. The blocker is urged under light energizing pressure of spring 56 into constant frictional engagement at 57 with pinion 28 so that the blocker tends to rotate with pinion 28 within the limits afforded by the travel of lug 54 circumferentially in slot 55.

Figures 4, 5, 6, 7, 8, 9:
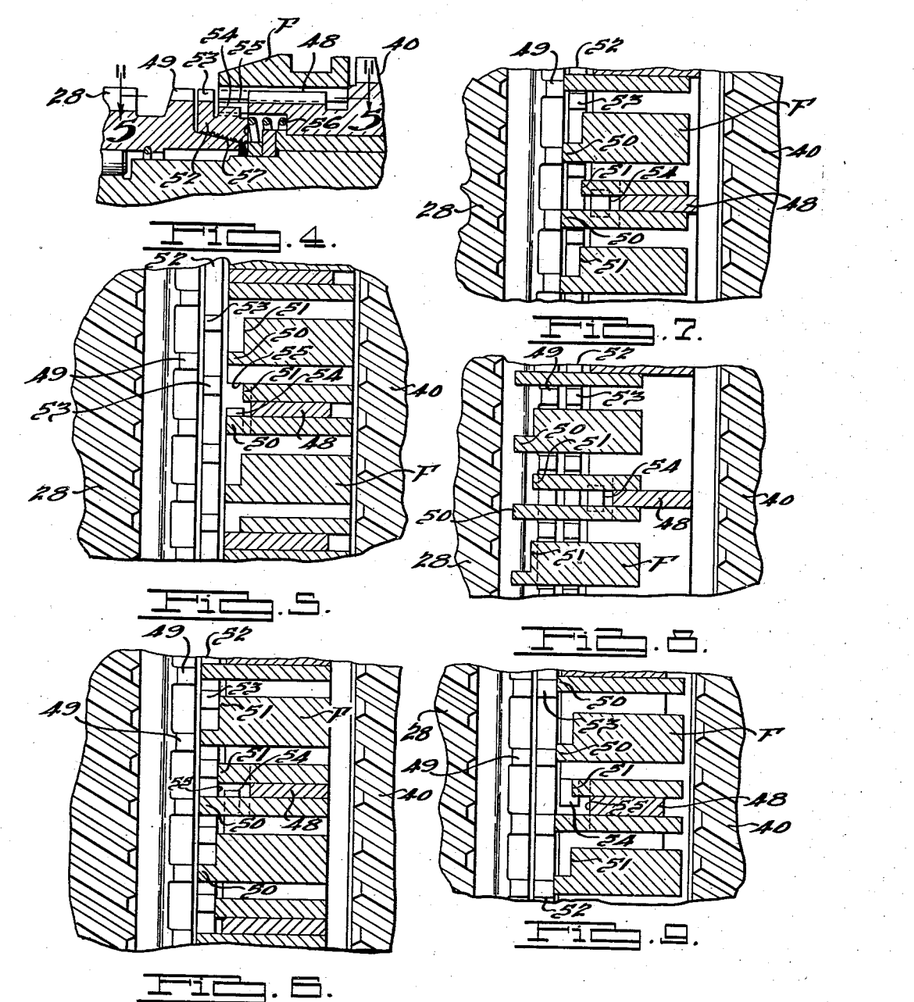
Fig. 4 is a detail enlarged view of the blocker clutch as seen in Fig. 3.
Fig. 5 is a sectional plan view illustrated as a development according to line 5—5 of Fig. 4, the automatic clutching sleeve being released.
Fig. 6 is a similar view showing the automatic clutching sleeve in its intermediate shift position during the drive blocking condition.
Fig. 7 is a similar view showing the automatic clutching sleeve in its coasting relationship for the Fig. 6 showing, the clutching sleeve being unblocked during coast for its clutching movement.
Fig. 8 is a similar view showing the automatic clutching sleeve in full clutching engagement.
Fig. 9 is a view similar to Fig. 5 but showing the automatic clutching sleeve in its other intermediate shift position during the coast blocking condition.

During drive in first and third, the speed of shaft 27 exceeds the speed of gear 40 so that, if sleeve F is fully released, the parts will be positioned as in Fig. 5 wherein the blocker teeth 53 are axially in alignment with the short teeth 51. If now the sleeve F is urged forwardly it will move to the Fig. 6 position of drive blocking and will remain in this blocked position as long as the engine drives the car in first or third.

If now the driver releases the accelerator pedal so that the engine may coast down under accommodation of overrunning clutch E, while sleeve F is urged forwardly, then when pinion 28 is reduced in speed to that of sleeve F slight further drop in speed of pinion 28 for a fraction of a revolution below the speed of sleeve F will cause blocker 52 to rotate slightly relative to sleeve F until blocker teeth 53 strike the adjacent sides of long teeth 50 as in Fig. 7 thereby limiting further reduction in speed of the blocker relative to sleeve F. At this time the sleeve F is free to complete its forward clutching shift with teeth 49, as in Fig. 8, the blocker teeth 53 passing between adjacent long and short teeth 50, 51. With the sleeve F thus clutched during engine coast, a two-way drive is established in second or fourth depending on whether the manually shiftable sleeve F was set for first or third just prior to the clutching shift of sleeve F.

In the event that sleeve F is urged forwardly from its Fig. 5 position at a time when the gear 40 is rotating faster than pinion 28, then the blocker 52 will lag behind the sleeve and will be blocked by engagement of long teeth 50 with the blocker teeth 53 as shown in Fig. 9. This is referred to as the coast blocking condition. If now the engine is speeded up by the driver depressing the accelerator pedal in the usual manner, then the engine and blocker 52 rotate forwardly and blocker teeth 53 move over to the Fig. 6 drive blocking position thereby jumping the gap between teeth 50 and 51. This is the primary reason for providing the long and short teeth whereby sleeve F clutches only from the drive blocking condition followed by engine coast which protects the teeth and avoids harsh clutching effects on the passengers and transmission mechanism. On accelerating the engine from the Fig. 9 coast blocking condition, the engine comes up to a speed limited by engagement of the overrunning clutch E for drive in either first or third depending on the setting of the manual shiftable sleeve 42. Then on releasing the accelerator pedal the sleeve F will synchronously clutch with teeth 49 during coast to step-up the drive to either second or fourth as aforesaid.

Figures 10, 11, 12, 13:
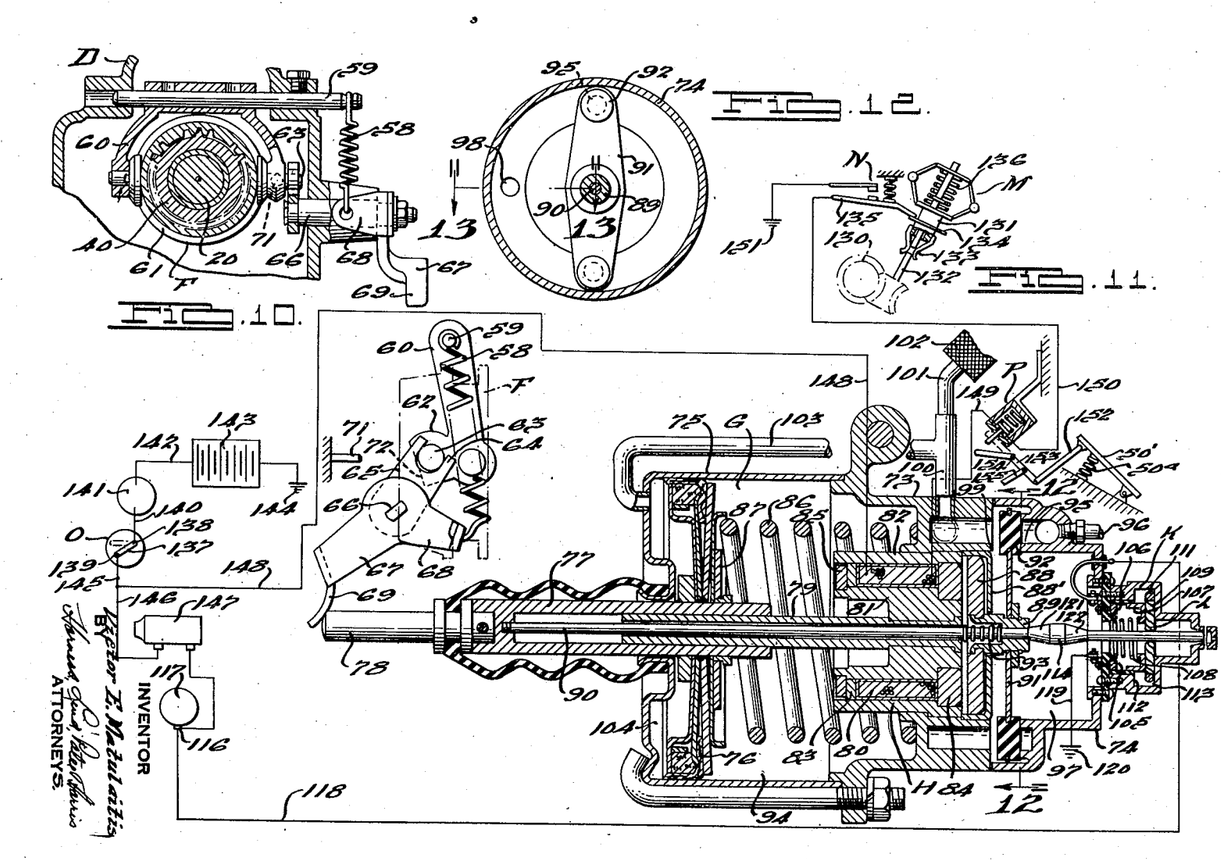
Fig. 10 is a sectional elevational view taken approximately as indicated by line 10—10 in Fig. 3 but showing only the upper portion of the transmission mechanism and particularly the lever operating mechanism for the automatic clutching sleeve.
Fig. 11 is a diagrammatic view of the control mechanism for the automatic clutching sleeve, the latter being shown in its released position.
Fig. 12 is a sectional elevational view taken as indicated by line 12—12 of Fig. 11.
Fig. 13 is a detail enlarged sectional plan view taken as indicated by line 13—13 of Fig. 12.
Figures 13, 14, 15:
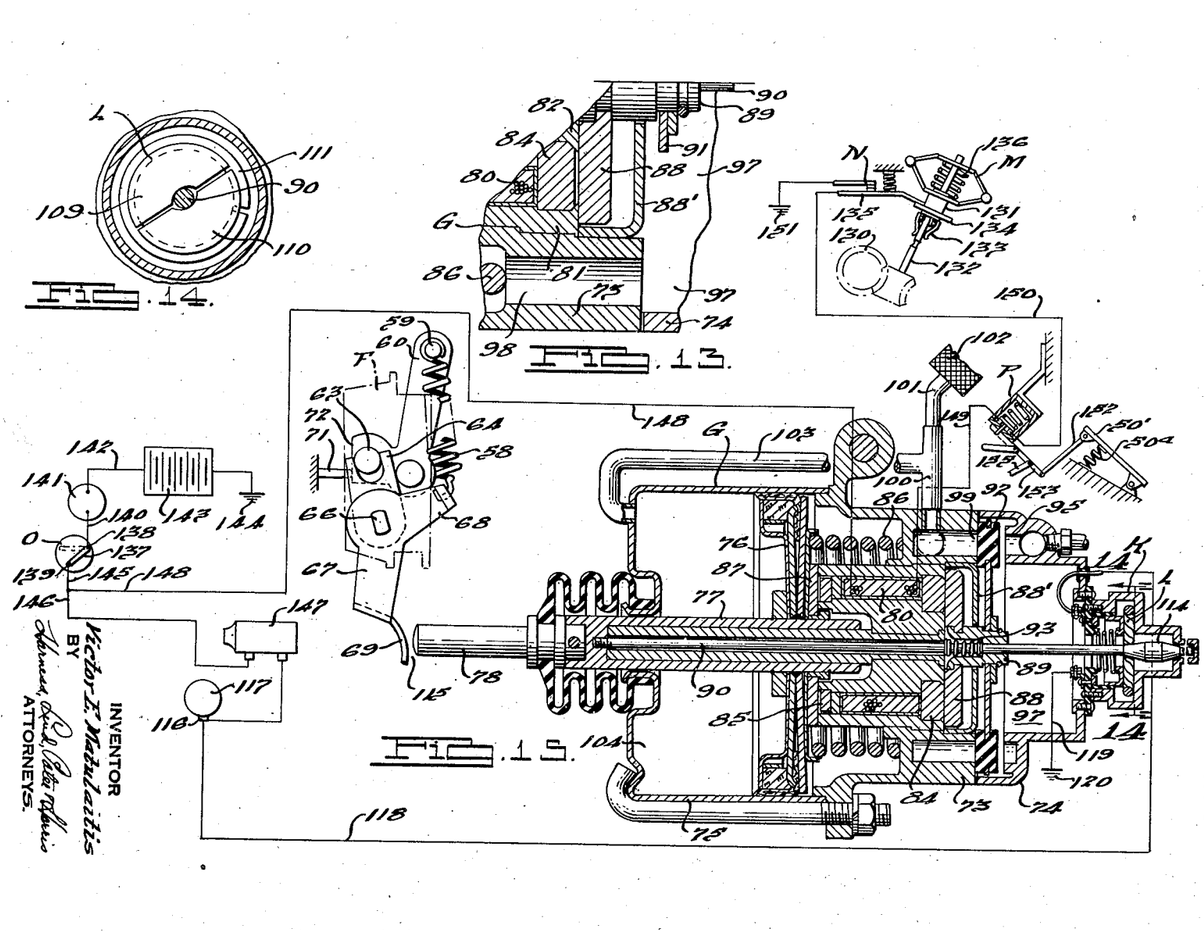
Fig. 14 is a detail sectional view showing a portion of the interrupter switch mechanism, the view being taken as indicated by line 14—14 of Fig. 15.
Fig. 15 is a view generally similar to Fig. 11 but illustrating the parts in positions corresponding to engaged position of the automatic clutching sleeve.

The transmission is provided with prime mover means for controlling shift of sleeve F along with several control means. Referring particularly to Figs. 11 and 15, there is illustrated a pressure fluid operated motor G utilizing differential air pressure for its operation. For convenience this motor is arranged to operate by the "vacuum" in the intake manifold system of the engine under control of electromagnetic means.

Forward shift of sleeve F is effected, under control of motor G, by reason of a spring 58 having its upper end fixed by engaging the outboard portion of a transverse shaft 59 fixed in the housing of transmission D. Mounted to freely rock on shaft 59 is a shift yoke 60 which engages the shift groove 61 of sleeve F, this yoke having one of its arms provided with a forwardly extending lever 62 carrying a lateral pin 63 which engages the yoke portion 64 of an upstanding lever 65. This lever 65 is fixed to the inboard end of a rockshaft 66 the outboard end of which has fixed thereto a bell-crank follower lever member having lever arms 67 and 68. The end of lever 68 is connected to the lower end of spring 58 and lever 67 carries an actuating abutment portion 69.

Spring 58 acts to yieldingly urge engagement of sleeve F, acting through lever 68, shaft 66 and lever 65, to cause pin 63 to swing yoke 60 forwardly on its shaft 59 until, when sleeve F is fully engaged, a stop pin 71 engages the forward flat face 72 of lever 62. This limits rearward swing of lever 67.

The motor G comprises a central body part 73 to which is secured the rear part 74 and the forward cylindrical closure part 75. A piston 76 slidably fits within cylinder 75 and is centrally secured to the rear portion of a hollow reciprocatory leader member or piston rod 77. The forward end of this piston rod carries an abutment leader rod or pin 78 fixed thereto and arranged to engage abutment 69 during its arcuate swing about the axis of shaft 66. The rear end of rod 77 is slidably mounted on a tubular support guide 79 which is part of a fixed assembly H for the coil 80 and inner and outer flux-directing iron cylinders 81, 82 connected by non-magnetic spacers 83, 84. A ferrous ring 85 is arranged with a gap between the front ends of cylinders 81 and 82 to provide a shunt flux path.

Thrusting forwardly on piston 76 is a sleeve-releasing or kickdown spring 86 of much greater force than that of spring 58 so that spring 86 can act to release sleeve F as in Fig. 11. In order to releasably hold the piston in its Fig. 15 position, a plate armature 87 is fixed to the rear face of the piston and adapted to engage the front ends of cylinders 81, 82 to complete the flux path at this point. The electromagnet H is of sufficient strength to hold piston 76 retracted against the force of spring 86.

At the rear of the part 73 there is provided a second plate armature 88 engageable as in Fig. 15 with the rear faces of cylinders 81, 82. A shield 88' is stationary and protects coil 80 against moisture and shields it magnetically. This armature is fixed to a sleeve 89 slidably on a switch operator or rod 90 which extends forwardly through guide 79 and piston rod 77 for attachment to the latter whereby rod 90 moves back and forth with the piston 76. Sleeve 89 mounts a support 91 carrying a valve member 92, a spring 93 acting between the rear end of the fixed guide 79 and sleeve 89 so as to bias valve member 92 to its Fig. 11 position of shutting off vacuum supply to the cylinder chamber 94 and venting the same.

The part 74 is formed with a valve seat 95 cooperable with valve 92 to control supply of vacuum from pipe 96 to chamber 97 in part 74, this chamber being always directly open to the working chamber 94 by a passage 98 as shown in Figs. 12 and 13. Pipe 96 extends forwardly for communication with the vacuum in the engine intake manifold J. The part 73 has a valve seat 99 also cooperable with valve 92 to control venting communication between chambers 94, 97 and vent pipe 100 which has one branch 101 leading to the atmosphere at the air cleaner 102 and a second branch 103 open to the cylinder chamber 104 forwardly of piston 76. It will be apparent that when the electromagnet H is energized, armature 88 will move forwardly to its Fig. 15 position of placing chamber 94 in communication with the intake manifold J, and when the electromagnet is de-energized as in Fig. 11 then spring 93 will bias valve 92 so as to vent chamber 94.

I have provided means functioning to relieve the thrust-application between the teeth of sleeve F and the teeth 49 thereby facilitating movement of the drive control sleeve element F from its Fig. 15 position of engaging relationship into its Fig. 11 position of disengaging relationship with respect to teeth 49. This relief means is in the form of a system of grounding the primary terminal of the usual distributor of the engine ignition system whereby the engine ignition may be momentarily rendered inoperative thereby unloading the torque at sleeve F sufficiently to insure its release by spring 86.

The interrupting system comprises an interrupter trip switch K having switch terminals 105, 106 adapted to be bridged for switch-closing function by an annular conductor 107 normally biased into its Fig. 11 switch-opening position by a spring 108. For moving conductor 107 into engagement with terminals 105, 106 I have provided a diametrically split disk L having portions 109, 110 surrounding the rear end portion of rod 90 and being biased into such position by a contracting split annular spring ring 111 (Fig. 14). Longitudinal displacement of the split disk L is limited by the end walls 112, 113.

Rod 90 has an enlarged portion 114 intermediate its length and so arranged that when the piston 76 is retracted as in Fig. 15, the portion 114 is rearward of disk L and switch K is open. At this time there is a gap 115 between the pin 78 and abutment 69. Once piston 76 has been retracted by vacuum to its Fig. 15 position, the electromagnet H will hold the piston in such retracted position irrespective of the continuance of vacuum in chamber 94. In order to effect disengaging shift of sleeve F, the electromagnet is de-energized, thereby causing spring 93 to move valve 92 to its Fig. 11 venting position. With the chamber 94 vented, spring 86 is then free to act to move piston 76 forward to take up gap 115, the piston not moving further until sleeve F is unloaded. When piston 76 moves the amount of gap 115, the rod portion 114 has moved disk L forwardly sufficiently to trip or close switch K whereupon the ignition system is grounded as by grounding primary terminal 116 of distributor 117 by the conductor 118, switch K, conductor 119, and ground 120. As soon as switch K closes then the torque is relieved at the teeth of sleeve F and spring 86 then acts to complete the piston stroke forwardly. The length of time that switch K will remain tripped or closed will depend on the length of the enlargement 114. After rod 90 has moved forwardly from its Fig. 15 position to close switch K, continued forward movement of the rod will maintain switch K closed during a portion of such continued movement because the forward taper 121 in passing through disk L causes the disk portions 109, 110 to separate and increase the contraction of spring 111 and hence the friction between the disk portions and rod. As the rod 90 continues its forward movement the rear taper 122 is engaged by the disk portions and spring 111 begins to lose its contracting effort previously stored up. Also, spring 108, which was compressed during closing of switch K, may now overcome the friction between rod 90 and disk L and therefore acts to open the switch. By appropriately varying the relationship of the parts, the switch may be maintained closed during any desired part of the forward piston stroke. In practice I have found that a switch closing of about one-third of the forward or kickdown stroke of the piston is satisfactory for the arrangement illustrated.

When piston 76 moves from its Fig. 11 position to its Fig. 15 position, switch K is not closed because the portion 114 merely expands spring 111 while holding disk L against the wall 113. Therefore there is no ignition interruption and no engine missing during the rearward piston stroke.

It is deemed preferably to provide a speed control on the energization of the electromagnetic coil 80 so as to insure automatic release of sleeve F below a predetermined car speed and to accommodate automatic engagement of sleeve F above a predetermined car speed. Whenever the car is in forward driving condition the manual sleeve 42 is either shifted rearwardly to the low range or forwardly to the high range so that by driving a governor from the countershaft 35 it is possible to provide a speed control operated proportionate to the speed of travel of the car. Driven from countershaft gear 130 is a governor M of any suitable type, this governor operating a sleeve 131 outwardly along its drive shaft 132 as the car speed reaches a predetermined point, the break-away being under control of a detent 133 if desired.

The sleeve 131 has a shoulder 134 engaged by the swinging switch piece 135 of the governor switch N. When the car is stationary the detent 133 is engaged and switch N is open. As the car accelerates, the governor eventually reaches its critical speed and detent 133 releases thereby causing switch N to close. As the car slows down, the governor spring 136 restores the parts to the Fig. 11 position and by proportioning the various parts it is obvious that switch N may be made to function at desired speeds proportionate to car travel. As an example of one arrangement of governor operation and gearing arrangement, the governor may be made to close switch N during car acceleration in first and third respectively at approximately 7 and 15 M. P. H. (miles per hour), the switch N opening on stopping the car in direct and second at approximately 7 and 3 M. P. H. respectively.

The driver operated ignition switch is designated at O and comprises a conductor 137 which, in the Fig. 11 position showing the switch "on" or closed, electrically connects contacts 138 and 139. Contact 138 extends by conductor 140 to ammeter 141 and thence by conductor 142 to the usual storage battery 143 and thence to ground 144. Contact 139 has a conductor 145 extending by conductor 146 branching therefrom to the engine ignition system herein shown in part as comprising coil 147 and distributor 117 having the primary terminal 116.

A second conductor 148 branches from conductor 145 to one of the terminals of coil 80 and thence by the other terminal to conductor 149 to the kick-down switch P and then by conductor 150 through switch N to ground 151. The switch P is normally closed and is opened preferably by a full depression of accelerator pedal 50' acting through link 152 and a bell-crank lever 153 pivotally mounted at 154. Lever 153 actuates a link 155 which extends forwardly to adjust the engine throttle valve lever 156. When pedal 50' is thus depressed, the lever 156 is positioned to fully open the throttle valve 157 and as the throttle valve is adjusted in its wide-open range the lever 153 opens switch P to effect a step-down in the transmission from fourth to third or from second to first by de-energizing the coil 80.

Switches P and N are in series so as to form a governor kick-down or holding coil circuit as follows: ground 144 to battery 143 thence by conductor 142 to ammeter 141 and by conductor 140 to ignition switch O. From switch O this circuit extends through conductors 145 and 148 to coil 80 and thence by conductor 149, switch P, conductor 150 and switch N to ground 151.

In the operation of the mechanism, the car at standstill and with ignition switch O closed and the engine idling will cause governor switch N to remain open as in Fig. 11 thereby breaking the governor kick-down circuit and de-energizing coil 80 even though the kick-down switch P is closed at this time. The parts are then in their Fig. 11 positions with valve 92 seated at 95 so that vacuum at pipe 96 is shut off from chambers 97 and 94 while these chambers are open through seat 99 to vent 100, thereby allowing spring 86 to hold piston 76 and rod 77 forwardly projected and sleeve F disengaged. Armature 87 is thus positioned forwardly away from coil 80 and armature 88 is positioned rearwardly from the coil but not so far but that it will respond to energization of the coil. Spring 93 acting through sleeve 89 is now acting to hold valve 92 against seat 95 as well to position armature 88 as in Fig. 11. Switch K is maintained open by the spring 108 so that the ignition system may operate normally without being grounded.

The driver now shifts sleeve 42 to either the high or low range and accelerates the car, ordinarily above the critical speed of governor M thereby causing switch N to close and establish the governor kick-down circuit. When this occurs the coil 80 is energized and armature 88 moves electromagnetically to its Fig. 15 position of magnetic attraction to the electromagnet means 81, 82, the annulus 85 constituting a gap shunt for the electromagnetic circuit at this time.

When armature 88 moves forwardly, valve 92 is caused to seat at 99. The vent 101 is now shut off from chambers 97 and 94, the latter being open to the vacuum in manifold J through pipe 96, chamber 97, and passage 98.

As the vacuum in manifold J is now open to chamber 94, chamber 104 being vented at 103, 101, piston 76 moves rearwardly bringing armature 87 in a position of electromagnetic attraction with respect to cylinders 81, 82 where it is electromagnetically held independently of the presence of vacuum in chamber 94. Switch K remains open during the rearward piston movement. As soon as the driver allows the engine to coast, sleeve F will engage teeth 49 synchronously under action of spring 58, to step-up the drive to either second or fourth although the step-up will be delayed by the blocker 52 until engine coast thereby enabling drive in the slower driving ratio of first or third as long as desired.

If the car is initially accelerated in first above the governor critical speed and the engine allowed to coast, then second will automatically become operative. Then if the driver shifts sleeve 42 forwardly to the high range, third will of course be skipped and fourth will be obtained because sleeve F will remain engaged. Ordinarily, especially where the car is equipped with a fluid coupling B, the sleeve 42 may be left in its high range and all starts and stops made without further shifting. This is possible owing to slippage in the fluid coupling when stopping the car for a traffic light and is practicable because the fluid coupling allows high engine torque for favorable car acceleration and because governor M directs a downshift on bringing the car to rest. Thus there is automatically provided a favorable torque-multiplying gearing for starting, as in third.

On bringing the car to a stop when sleeve F is clutched as in fourth, for example, the governor M opens the switch N to allow spring 86 to release sleeve F which it can do as the car is brought to a stop because of the low coasting torque at the teeth of sleeve F. The interruption of the ignition system at this time does not relieve or reverse the torque at the teeth of the sleeve unless the governor is arranged to open on coast down at a car speed below engine idle and such may be readily provided although by providing a spring 86 of proper strength the sleeve F will, in any event, release on car coast to a stop.

Whenever the car is driving in fourth or second above the governor critical speed, a full depression of the accelerator pedal will cause the transmission to step-down to third or first, the transmission step-up back to fourth or second taking place on release of the accelerator pedal with attendant synchronization of sleeve F with teeth 49.

When the accelerator pedal is thus fully depressed for the kickdown, switch P opens thereby de-energizing coil 80. Armature 87 and piston 76 cannot move forwardly more than the amount of gap 115 to release sleeve F because the latter is under torque load by reason of the engine driving under open throttle. However, armature 88 immediately moves to its Fig. 11 position by spring 93 thereby causing valve 92 to shut off the vacuum supply to chamber 94 and to vent this chamber as aforesaid. Also, at this time the forward piston stroke in taking up gap 115 causes enlargement 114 to close switch K so that the ignition interrupting circuit is established to ground the ignition system at 120 and this causes the engine to unload the torque at sleeve F whereupon spring 86 acts through rod 77, pin 78, and the sleeve linkage to disengage sleeve F. As the piston completes about one-third of its forward stroke, spring 108 moves disk L away from taper 122 thereby opening switch K, restoring the engine ignition and allowing the engine to rapidly speed up to pick up the drive in third or first at the overrunning clutch E. Ordinarily sleeve F will always disengage in response to closing of switch K so that this switch may be arranged to open during one-third to one-half of the travel of sleeve F rearwardly but this relationship may, of course, be readily varied.

When the driver reelases the accelerator pedal, assuming governor switch N to be closed, coil 80 is energized to cause armature 88 to move to its Fig. 15 position moving valve 92 to again supply vacuum to chamber 94. This causes piston 76 to move rearwardly and it will be noted that the ignition is not interrupted during this stroke of the piston. As soon as the engine slows down to synchronize the teeth 49 with sleeve F, the latter will then shift forwardly by spring 58 to restore direct drive from pinion 28 to gear 40.

I claim:

1. In a power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a reciprocatory thrust member movable in a direction of thrust transmission to urge operation of said element to its first said position and in a return direction to accommodate movement of said element to its second said position; a switch comprising a pair of switch conductors one of which is movable relative to the other between positions of relative engagement and disengagement of said switch conductors; grounding circuit means for said ignition system including said switch so arranged that when said movable switch conductor is in one of its said positions then said ignition system is rendered inoperative and when said movable switch conductor is in another of its said positions then said ignition system is operative; means biasing said movable switch conductor to its said another position; a switch operator movable with said reciprocatory thrust member; and means frictionally engaging said switch operator for moving said movable switch conductor to its said one position when said thrust member moves in the direction of its said thrust-transmission while allowing said switch to remain open when said thrust member moves in its said direction of return.

2. In a power transmission according to claim 1, said frictionally engaging means comprising a plurality of disk segments, and means biasing said segments into engagement with said switch operator.

3. In a power transmission according to claim 1, said frictionally engaging means comprising an element biased into frictional engagement with said switch operator and capable of limited reciprocatory movement in a direction parallel to that of said switch operator.

4. In a power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; prime mover means operable to control operation of said element between its said positions; a switch operating member reciprocated between two positions in response to operation of said prime mover means in controlling operation of said element as aforesaid; a switch comprising a movable contact biased into switch-opened position; a grounding circuit for said ignition system including said switch; and means frictionally engaging said switch operating member for moving said movable contact into switch-closed position when said switch operating member moves in one of its directions of reciprocation while accommodating relative movement between said switch operating member and said movable contact such that said movable contact will remain in its said switch-opened position during movement of said switch operating member in the other of its said directions of reciprocation.

5. In a power transmission according to claim 4, said frictionally engaging means comprising a plurality of disk segments, and means biasing said segments into engagement with said switch operating member.

6. In a power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a movable follower member operably connected to said element for operating said element from its said second position to its said first position; means biasing said element from its said first position to its said second position; prime mover means for controlling movement of said follower member, said prime mover means comprising an electromagnet having a flux-generating coil and a reciprocatory armature; a reciprocatory structure projecting through said coil and having a leader member at one end thereof disposed to move said follower member thereby to effect movement of said element to its said first position, said reciprocatory structure having a switch operator adjacent its other end; power means operable to move said reciprocatory structure so as to provide a gap between said leader member and said follower member and to dispose said armature in electromagnetic association with said electromagnet; a spring biasing said reciprocatory structure so as to cause said leader member to take up said gap and move said follower member for effecting operation of said element to its said first position as aforesaid; means controlling energization of said coil; a switch operated in response to movement of said switch operator such that said switch is closed when said leader member moves as aforesaid to take up said gap and such that said switch remains open during return movement of said reciprocatory structure by said power operating means in accommodating operation of said element from its said first position to its said second position by said element-biasing-means; and a grounding circuit for said ignition system including said switch.

7. In a power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a movable follower member operably connected to said element for operating said element from its said second position to its said first position; means biasing said element from its said first position to its said second position; prime mover means for controlling movement of said follower member, said prime mover means comprising an electromagnet having a flux-generating coil and a reciprocatory armature; a reciprocatory structure projecting through said coil and having a leader member at one end thereof disposed to move said follower member thereby to effect movement of said element to its said first position, said reciprocatory structure having a switch operator adjacent its other end; power means operable to move said reciprocatory structure so as to provide a gap between said leader member and said follower member and to dispose said armature in electromagnetic association with said electromagnet; a spring biasing said reciprocatory structure so as to cause said leader member to take up said gap and move said follower member for effecting operation of said element to its said first position as aforesaid; means controlling energization of said coil; a switch comprising a relatively stationarily mounted terminal and a movable terminal adapted for movement into engaging and disengaging relationship with respect to said stationary terminal for switch-closing and switch-opening functions respectively; means biasing said movable terminal into its said switch-opening relationship; means frictionally engaging said switch operator for moving said movable terminal into its said switch-closing relationship when said leader member moves as aforesaid to take up said gap, said frictionally engaging means allowing said switch to remain open during return movement of said reciprocatory structure by said power operating means in accommodating operation of said element from its said first position to its said second position by said element-biasing-means; and a grounding circuit for said ignition system including said switch.

8. In a power transmission for driving a vehicle having an engine provided with an ignition system; a transmission drive-controlling element operable from a first position to a second position for effecting a step-up change in the transmission drive speed ratio and from said second position to said first position when operation of said ignition system is interrupted to relieve thrust at said element; a movable follower member operable connected to said element for operating said element from its said second position to its said first position; means biasing said element from its said first position to its said second position; prime mover means for controlling movement of said follower member, said prime mover means comprising an electromagnet having a flux-generating coil and a reciprocator armature; a reciprocatory structure projecting through said coil and having a leader member at one end thereof disposed to move said follower member thereby to effect movement of said element to its said first position, said reciprocatory structure having a switch operator adjacent its other end; power means operable to move said reciprocatory structure so as to provide a gap between said leader member and said follower member and to dispose said armature in electromagnetic association with said electromagnet; a spring biasing said reciprocatory structure so as to cause said leader member to take up said gap and move said follower member for effecting operation of said element to its said first position as aforesaid; means controlling energization of said coil; a switch comprising a relatively stationarily mounted terminal and a movable terminal adapted for movement into engaging and disengaging relationship with respect to said stationary terminal for switch-closing and switch-opening functions respectively; means biasing said movable terminal into its said switch-opening relationship; means frictionally engaging said switch operator for moving said movable terminal into its said switch-closing relationship when said leader member moves as aforesaid to take up said gap, said frictionally engaging means allowing said switch to open by operation of said terminal-biasing-means prior to completion of said movement of said follower member in operating said element to its said first position and to remain open during return movement of said reciprocatory structure by said power operating means in accommodating operation of said element from its said first position to its said second position by said element-biasing-means; and a grounding circuit for said ignition system including said switch.

VICTOR E. MATULAITIS.